(12) United States Patent
Okada et al.

(10) Patent No.: US 10,209,151 B2
(45) Date of Patent: Feb. 19, 2019

(54) TORQUE SENSOR

(71) Applicants: TRI-FORCE MANAGEMENT CORPORATION, Ageo-shi, Saitama (JP); DAI-ICHI SEIKO CO., LTD., Kyoto-shi, Kyoto (JP)

(72) Inventors: Kazuhiro Okada, Ageo (JP); Satoshi Era, Ageo (JP); Nobuhiro Nagamoto, Kyoto (JP); Takahito Kamiudo, Kyoto (JP); Kazuto Akiba, Kyoto (JP)

(73) Assignees: TRI-FORCE MANAGEMENT CORPORATION, Saitama (JP); DAI-ICHI SEIKO CO., LTD., Kyoto (JP)

( * ) Notice: Subject to any disclaimer, the term of this patent is extended or adjusted under 35 U.S.C. 154(b) by 0 days.

(21) Appl. No.: 15/745,979

(22) PCT Filed: Jul. 21, 2016

(86) PCT No.: PCT/JP2016/071432
§ 371 (c)(1),
(2) Date: Jan. 18, 2018

(87) PCT Pub. No.: WO2017/018319
PCT Pub. Date: Feb. 2, 2017

(65) Prior Publication Data
US 2018/0209860 A1    Jul. 26, 2018

(30) Foreign Application Priority Data
Jul. 29, 2015   (JP) .................................. 2015-149611

(51) Int. Cl.
*G01L 3/10*     (2006.01)
*G01L 3/14*     (2006.01)
(Continued)

(52) U.S. Cl.
CPC .................. *G01L 3/10* (2013.01); *G01L 3/14* (2013.01); *G01L 1/14* (2013.01); *G01L 1/2231* (2013.01);
(Continued)

(58) Field of Classification Search
CPC . G01L 1/14; G01L 1/2231; G01L 3/10; G01L 3/106; G01L 3/1442; G01L 3/1428; G01L 3/1435; G01L 5/165; G01L 5/16
(Continued)

(56) References Cited

U.S. PATENT DOCUMENTS 5,969,268 A * 10/1999 Sommerfeld ......... G01L 1/2206
73/862.041
6,038,933 A *  3/2000 Meyer .................. G01L 1/2206
73/146
(Continued)

FOREIGN PATENT DOCUMENTS

JP    05-118943 A    5/1993
JP    06-041892 B    6/1994
(Continued)

OTHER PUBLICATIONS

Written Amendment (JP Patent Application No. 2015-149611); dated Dec. 9, 2016; English Translation.
(Continued)

*Primary Examiner* — Jonathan Dunlap
(74) *Attorney, Agent, or Firm* — Howard & Howard Attorneys PLLC

(57) ABSTRACT

An inner support member, a detection deformable body, and a ring-shaped outer support member are disposed sequentially from the inside to the outside around a Z axis as a central axis. Inner surfaces in the vicinity of inner support points of the detection deformable body connect to outer surfaces of the inner support member via inner connecting (Continued)

members, and outer surfaces in the vicinity of outer support points of the detection deformable body connect to inner surfaces of the outer support member via outer connecting members. When a torque acts in the clockwise direction on the outer support member (130) while the inner support member is fixed, detection parts are displaced outwardly, and detection parts are displaced inwardly. These displacements are detected electrically as changes in capacitance values of four capacitor elements including opposing electrodes.

8 Claims, 5 Drawing Sheets

(51) Int. Cl.
    *G01L 1/22* (2006.01)
    *G01L 1/14* (2006.01)
    *G01L 5/16* (2006.01)

(52) U.S. Cl.
    CPC ............ *G01L 3/106* (2013.01); *G01L 3/1428* (2013.01); *G01L 3/1435* (2013.01); *G01L 3/1442* (2013.01); *G01L 5/16* (2013.01); *G01L 5/165* (2013.01)

(58) Field of Classification Search
    USPC ........ 73/862.337, 862.08, 862.191, 862.321, 73/862.041–862.045, 862.325, 862.621, 73/862.626
    See application file for complete search history.

(56) References Cited

U.S. PATENT DOCUMENTS

| | | | | |
|---|---|---|---|---|
| 6,517,113 | B1* | 2/2003 | Nicot | B62D 1/10 280/771 |
| 6,575,031 | B2* | 6/2003 | Haeg | G01M 1/225 73/146 |
| 6,694,828 | B1* | 2/2004 | Nicot | B62D 1/16 180/422 |
| 6,769,312 | B2* | 8/2004 | Meyer | G01L 1/2231 73/862.042 |
| 7,055,398 | B2* | 6/2006 | Yuan | G01L 3/108 73/862.08 |
| 7,520,182 | B2* | 4/2009 | Takamura | G01L 3/1457 73/862.08 |
| 8,161,827 | B2* | 4/2012 | Kato | G01L 3/1457 73/862.044 |
| 8,667,854 | B2* | 3/2014 | Nishioki | G01L 3/106 73/780 |
| 8,966,996 | B2* | 3/2015 | Okada | G01L 1/14 73/862.041 |
| 2002/0059837 | A1* | 5/2002 | Meyer | G01L 1/2231 73/862.042 |
| 2002/0073786 | A1* | 6/2002 | Meyer | G01L 5/161 73/862.046 |
| 2002/0100323 | A1* | 8/2002 | Haeg | G01M 1/225 73/503 |
| 2004/0244504 | A1* | 12/2004 | Yuan | G01L 3/108 73/862.453 |
| 2005/0056100 | A1* | 3/2005 | Yuan | G01L 3/108 73/862.322 |
| 2006/0107761 | A1* | 5/2006 | Meyer | G01L 1/2206 73/862.044 |
| 2006/0130595 | A1* | 6/2006 | Meyer | G01L 5/161 73/862.041 |
| 2007/0180931 | A1* | 8/2007 | Takamura | G01L 3/1457 73/862.08 |
| 2010/0005907 | A1* | 1/2010 | Kato | G01L 3/1457 73/862.044 |
| 2013/0167661 | A1* | 7/2013 | Nishioki | G01L 3/10 73/862.337 |
| 2013/0319135 | A1* | 12/2013 | Okada | G01L 1/14 73/862.043 |
| 2015/0292969 | A1* | 10/2015 | Choi | G01L 5/165 73/862.041 |

FOREIGN PATENT DOCUMENTS

| | | |
|---|---|---|
| JP | 2001-500979 A | 1/2001 |
| JP | 2011-257404 A | 12/2011 |
| JP | 2012-037300 | 2/2012 |
| JP | 4963138 B1 | 6/2012 |
| JP | 5667723 B | 12/2014 |

OTHER PUBLICATIONS

Decision to Grant a Patent (JP Patent Application No. 2015-149611) dated Jan. 10, 2017; English Translation.
International Search Report and Written Opinion (International Application No. PCT/JP2016/071432); dated Aug. 16, 2016; 5 pages.
Notification of Reasons for Refusal (JP Patent Application No. 2015-148611); dated Nov. 9, 2016; 4 pages.

* cited by examiner

TORQUE SENSOR

CROSS-REFERENCE TO RELATED APPLICATIONS

The present application is a U.S. National Phase of International Application No. PCT/JP2016/071432, filed on Jul. 21, 2016, which claims the benefit of Japanese Patent Application No. 2015-149611, filed on Jul. 29, 2015, the disclosures of which are hereby incorporated by reference in their entirety.

TECHNICAL FIELD

The present disclosure relates to a torque sensor, and particularly relates to a sensor capable of detecting torque acting around a rotation axis.

BACKGROUND ART

Torque sensors for detection of a torque acting around a rotation axis are widely used in various kinds of transport equipment and industrial apparatuses. For example, the below-listed Patent Literature 1 discloses a sensor that, by using a strain gauge to detect strain occurring in a ring-shaped load detection mechanism, detects an operating force component and a moment component as electrical signals. Further, Patent Literature 2 discloses a sensor that detects as electrical signals an operating force component and a moment component by detection of strain occurring in radial direction components arranged between a rigid central component and a rigid circular ring.

Further, Patent Literature 3 discloses a sensor that detects as an electrical signal a torque acting around a rotation axis, by using capacitor elements to detect elastic deformation of a detection ring that has a through-hole through which a rotation shaft is inserted, and by supporting the detection ring via a support member from either side along the rotation shaft. Further, Patent Literature 4 discloses a sensor capable of adjusting balance of detection sensitivity between force and moment while securing an internal space, by adopting a structure that arranges multiple detection rings adjacent to one another.

CITATION LIST

Patent Literature

Patent Literature 1: Examined Japanese Patent Application Publication No. H06-041892
Patent Literature 2: National Patent Publication No. 2001-500979
Patent Literature 3: Unexamined Japanese Patent Application Kokai Publication No. 2012-037300
Patent Literature 4: Japanese Patent No. 5667723

SUMMARY OF INVENTION

Technical Problem

For an application such as a torque sensor attached to a joint part of a robot arm, the torque sensor preferably has a simple structure and is thin. However, thickness reduction of the torque sensors proposed heretofore is difficult due to structural factors.

For example, weight reduction is difficult for the sensor disclosed in the aforementioned Patent Literature 1 due to a need to attach two rigid members to the ring-shaped load detection mechanism. Further, the sensor disclosed in Patent Literature 2 has a complicated structure overall and is unsuitable for weight reduction due to detection of the strain occurring in the radial direction component. Further, weight reduction of the sensors disclosed in Patent Literature 3 and Patent Literature 4 is difficult due to adoption of structures that stack layers of detection rings or support members.

In consideration of the aforementioned circumstances, an objective of the present invention is to provide a thin and light-weight torque sensor that has a simple structure.

Solution to Problem (1) A first aspect of a torque sensor for detection of a torque around a rotation axis includes:

a detection deformable body having elastic deformability in at least a portion thereof, and including a first ring-shaped structure body disposed along a basic ring-shaped pathway surrounding a periphery of the rotation axis;

an inner support member disposed at an inner side of the detection deformable body;

an outer support member including a second ring-shaped structure body disposed at an outer side of the detection deformable body;

an inner connecting member connecting the detection deformable body and the inner support member;

an outer connecting member connecting the detection deformable body and the outer support member; and a detection element for detecting elastic deformation occurring in the detection deformable body, wherein, when an inner support point and an outer support point are defined at mutually different positions of the basic ring-shaped pathway, (i) the inner connecting member connects together an inner connecting surface disposed in a vicinity of the inner support point of an inner surface of the detection deformable body and an outer connecting surface disposed in a vicinity of the inner support point of the inner surface of the detection deformable body, (ii) the outer connecting member connects together an outer connecting surface disposed in a vicinity of the outer support point of the outer surface of the detection deformable body and an opposing surface of the outer support member facing the outer connecting surface, and (iii) the detection element detects elastic deformation of a detection part positioned between the inner support point and the outer support point of the detection deformable body.

(2) A second aspect of the present disclosure is the torque sensor according to the aforementioned first aspect, in which, when the rotation axis is disposed on a Z axis of an XYZ three-dimensional orthogonal coordinate system, the basic ring-shaped passageway is included in an XY plane, and the detection deformable body, the inner support member, the outer support member, the inner connecting member, and the outer connecting member are each disposed along the XY plane.

(3) A third aspect of the present disclosure is the torque sensor according to the aforementioned second aspect, in which the inner support point is a plurality of n inner support points and the outer support point is a plurality of n outer support points in the basic ring-shaped pathway, n is greater than or equal to 2, the inner support points and the outer support points are alternatingly arranged, the inner connecting member is a plurality of n inner connecting members, and the outer connecting member is a plurality of n outer connecting members.

(4) A fourth aspect of the present disclosure is the torque sensor according to the aforementioned third aspect, in which, by setting n equal to two:

the plurality of n inner support points is a first inner support point and a second inner support point;

the plurality of n outer support points is a first outer support point and a second outer support point;

the two inner support points and the two outer support points are alternatingly disposed in the basic ring-shaped pathway;

the first inner support point is disposed at an intersection of a positive side of the X axis and the basic ring-shaped pathway, the second inner support point is disposed at an intersection of a negative side of the X axis and the basic ring-shaped pathway, the first outer support point is disposed at an intersection of a positive side of the Y axis and the basic ring-shaped pathway, and the second outer support point is disposed at an intersection of a negative side of the Y axis and the basic ring-shaped pathway; and the plurality of n inner connecting members is a first inner connecting member and a second inner connecting member;

the plurality of n outer connecting members is a first outer connecting member and a second outer connecting member; and the first inner connecting member is disposed on the positive side of the X axis, the second inner connecting member is disposed on the negative side of the X axis, the first outer connecting member is disposed on the positive side of the Y axis, and the second outer connecting member is disposed on the negative side of the Y axis.

(5) A fifth aspect of the present disclosure is the torque sensor according to the aforementioned fourth aspect, in which the detection part is: (i) a first detection part disposed in a first quadrant of the XY coordinate system, (ii) a second detection part disposed in a second quadrant of the XY coordinate system, (iii) a third detection part disposed in a third quadrant of the XY coordinate system, and (iv) a fourth detection part disposed in a fourth quadrant of the XY coordinate system; and the detection element is: (i) a first detection element for detection of elastic deformation of the first detection part, (ii) a second detection element for detection of elastic deformation of the second detection part, (iii) a third detection element for detection of elastic deformation of the third detection part, and (iv) a fourth detection element for detection of elastic deformation of the fourth detection part.

(6) A sixth aspect of the present disclosure is the torque sensor according to the aforementioned fifth aspect, in which the first detection element detects elastic deformation based on a radial direction displacement of the first detection part centered on the Z axis, the second detection element detects deformation based on a radial direction displacement of the second detection part centered on the Z axis, the third detection element detects deformation based on a radial direction displacement of the third detection part centered on the Z axis, and the fourth detection element detects deformation based on a radial direction displacement of the fourth detection part centered on the Z axis.

(7) A seventh aspect of the present disclosure is the torque sensor according to the aforementioned sixth aspect, in which the first detection element has a first capacitor element including (i) a first displacement electrode disposed on an inner surface of the first detection part, and (ii) a first fixed electrode disposed on the inner support member at a position thereof opposing the first displacement electrode, the second detection element has a second capacitor element including (i) a second displacement electrode disposed on an inner surface of the second detection part, and (ii) a second fixed electrode disposed on the inner support member at a position thereof opposing the second displacement electrode, the third detection element has a third capacitor element including (i) a third displacement electrode disposed on an inner surface of the third detection part, and (ii) a third fixed electrode disposed on the inner support member at a position thereof opposing the third displacement electrode, and the fourth detection element has a fourth capacitor element including (i) a fourth displacement electrode disposed on an inner surface of the fourth detection part, and (ii) a fourth fixed electrode disposed on the inner support member at a position thereof opposing the fourth displacement electrode.

(8) An eighth aspect of the present disclosure is the torque sensor according to the aforementioned sixth aspect, in which the first detection element has a first capacitor element including (i) a first displacement electrode disposed on an outer surface of the first detection part, and (ii) a first fixed electrode disposed on the outer support member at a position thereof opposing the first displacement electrode, the second detection element has a second capacitor element including (i) a second displacement electrode disposed on an outer surface of the second detection part, and (ii) a second fixed electrode disposed on the outer support member at a position thereof opposing the second displacement electrode, the third detection element has a third capacitor element including (i) a third displacement electrode disposed on an outer surface of the third detection part, and (ii) a third fixed electrode disposed on the outer support member at a position thereof opposing the third displacement electrode, and the fourth detection element has a fourth capacitor element including (i) a fourth displacement electrode disposed on an outer surface of the fourth detection part, and (ii) a fourth fixed electrode disposed on the outer support member at a position thereof opposing the fourth displacement electrode.

(9) A ninth aspect of the present disclosure is the torque sensor according to the aforementioned seventh or eighth aspect, further including:

a detection circuit for outputting of a detection value of the torque acting around the rotation axis based on a difference between: (i) a sum of a capacitance value of the first capacitor element and a capacitance value of the third capacitor element, and (ii) a sum of a capacitance value of the second capacitor element and a capacitance value of the fourth capacitor element.

(10) An tenth aspect of the present disclosure is the torque sensor according to the aforementioned sixth aspect, in which the first detection element has:

a first inner capacitor element including (i) a first inner displacement electrode disposed on an inner surface of the first detection part, and (ii) a first fixed electrode disposed on the inner support member at a position thereof opposing the first displacement electrode, and
a first outer capacitor element including (i) a first outer displacement electrode disposed on an outer surface of the first detection part, and (ii) a first outer fixed electrode disposed on the outer support member at a position thereof opposing the first outer displacement electrode, the second detection element has:
a second inner capacitor element including (i) a second inner displacement electrode disposed on an inner surface of the second detection part, and (ii) a second fixed electrode disposed on the inner support member at a position thereof opposing the second displacement electrode, and
a second outer capacitor element including (i) a second outer displacement electrode disposed on an outer surface of the second detection part, and (ii) a second outer fixed electrode disposed on the outer support member at a position thereof opposing the second outer displacement electrode, the third detection element has:
a third inner capacitor element including (i) a third inner displacement electrode disposed on an inner surface of the third detection part, and (ii) a third fixed electrode disposed on the inner support member at a position thereof opposing the third displacement electrode, and
a third outer capacitor element including (i) a third outer displacement electrode disposed on an outer surface of the third detection part, and (ii) a third outer fixed electrode disposed on the outer support member at a position thereof opposing the third outer displacement electrode, and the fourth detection element has:
a fourth inner capacitor element including (i) a fourth inner displacement electrode disposed on an inner surface of the fourth detection part, and (ii) a fourth fixed electrode disposed on the inner support member at a position thereof opposing the fourth displacement electrode, and
a fourth outer capacitor element including (i) a fourth outer displacement electrode disposed on an outer surface of the fourth detection part, and (ii) a fourth outer fixed electrode disposed on the outer support member at a position thereof opposing the fourth outer displacement electrode.

(11) An eleventh aspect of the present disclosure is the torque sensor according to the aforementioned second to tenth aspects, in which
the basic ring-shaped pathway is a first circle disposed in the XY plane and centered on an origin point O,
the ring-shaped structure body included in the detection deformable body extends along the first circle,
the outer support member is disposed in the XY plane and is centered on the origin point O, and the ring-shaped structure body included in the outer support member extends along a second circle having a radius larger than a radius of the first circle.

(12) A twelfth aspect of the present disclosure is the torque sensor according to the aforementioned eleventh aspect, in which the inner support member includes:
a ring-shaped structure body disposed in the XY plane, centered on the origin point O, and extending along a third circle having a radius smaller than the radius of the first circle.

(13) An thirteenth aspect of the present disclosure is the torque sensor according to the aforementioned second to twelfth aspects, in which
within the XYZ three-dimensional orthogonal coordinate system, an upper surface of the outer support member is disposed in a first plane indicated by a formula $Z=+d$, and a lower surface of the outer support member is disposed in a second plane indicated by a formula $Z=-d$, and
all of the detection deformable body, the inner support member, the outer support member, the inner connecting member, and the outer connecting member are contained within a space sandwiched between the first plane and the second plane.

(14) A fourteenth aspect of the present disclosure is the torque sensor according to the aforementioned second to twelfth aspects, in which, when the Z axis of the XYZ three-dimensional orthogonal coordinal system is a vertical axis,
an upper end surface of the outer support member is positioned above an upper end surface of the inner support member by a predetermined gap, and
a lower end surface of the inner support member is positioned below a lower end surface of the outer support member by the predetermined gap.

Advantageous Effects of Invention

In the torque sensor of the present disclosure, the inner support member is disposed inward of the detection deformable body in which elastic deformation occurs, and the ring-shaped outer support member is disposed outward of the detection deformable body. Furthermore, the inner surface of the detection deformable body and the opposing surface of the inner support member are connected by the inner connecting member, and the outer surface of the detection deformable body and the opposing surface of the outer support member are connected by the outer connecting member. Thus all of the component elements are disposed along a plane, and the torque sensor can be achieved that has a simple structure and is thin and light-weight.

DESCRIPTION OF EMBODIMENTS

Embodiments of the present description are described below in detail in reference to figures.

Section 1, Basic Structure of Embodiment 1

Figure 1:
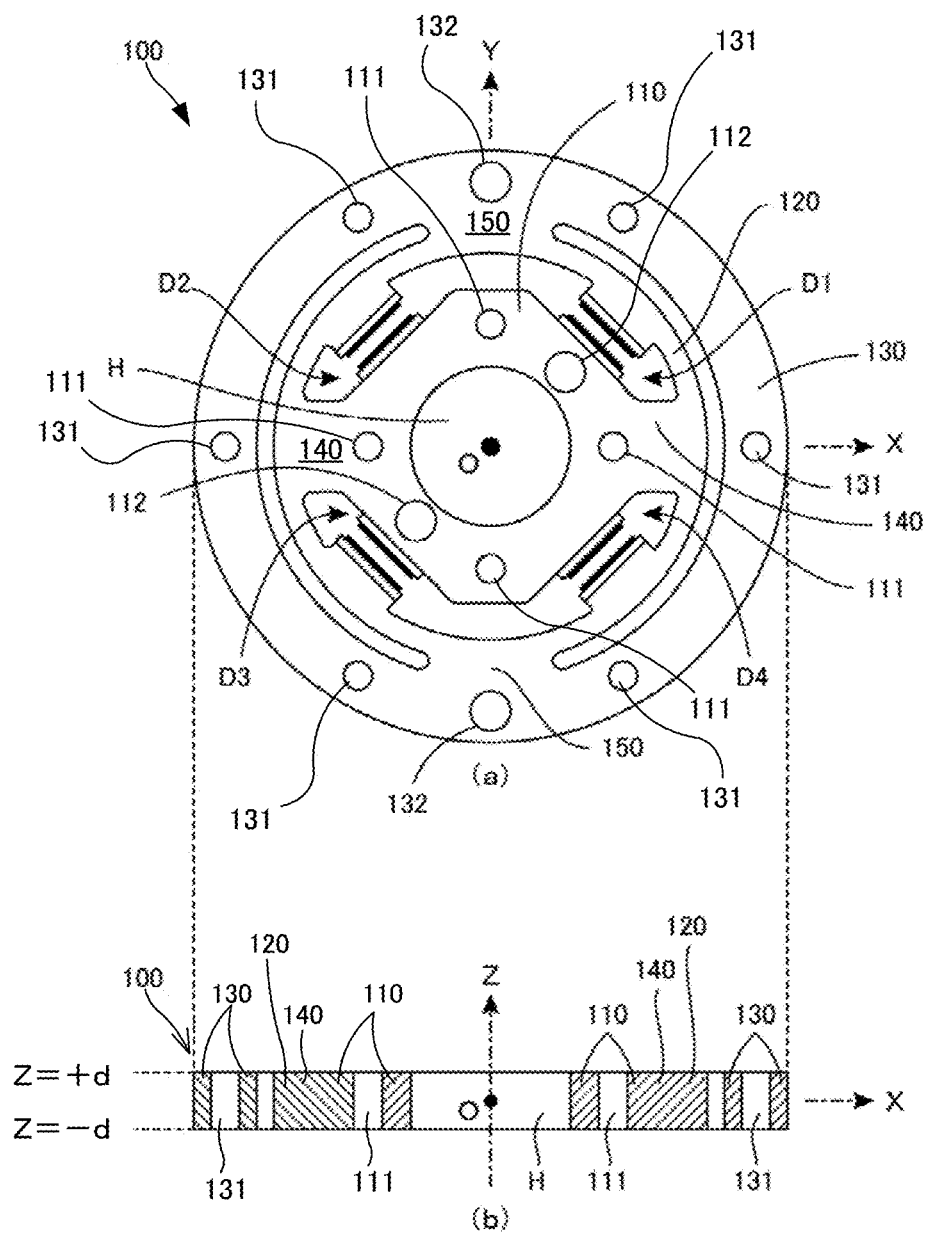
FIG. 1 includes a top surface view of a torque sensor according to Embodiment 1 of the present disclosure and a front cross-sectional view taken along an XZ plant cutting the torque sensor according to Embodiment 1.

FIG. 1 includes a top surface view of a torque sensor according to Embodiment 1 of the present disclosure, and a front cross-sectional view taken along an XZ plane cutting the torque sensor.

As illustrated in FIG. 1, a basic structure body 100 forming a main structural portion of the torque sensor has an overall disc shape. Here for ease of description, as illustrated in the figures, structures of various components are described by defining an XYZ three-coordinate orthogonal coordinate system that has an origin point O located at the center of the torque sensor, and by assuming that the torque sensor is arranged in this coordinate system. In the top surface view of FIG. 1, an X axis is defined as the rightward direction in the figure, a Y axis is defined as the upward direction in the figure, and a Z axis is defined as the direction perpendicular to and out of the plane of the paper. The torque sensor is disposed such that the central axis thereof is the Z axis. In the front cross-section view of FIG. 1, the X axis is defined to be the rightward direction in the paper surface of the figure, the Z axis is defined to be the upward direction in the paper surface of the figure, and the Y axis is defined to be the direction perpendicular to and into the paper surface. This torque sensor functions by detecting torque acting around a rotation axis that is the Z axis. Further, the expression "rotation axis" means a virtual axis for definition of the detected torque.

As illustrated in FIG. 1, the basic structure body 100 includes an inner support member 110 located at an inside of the basic structure body 100, a detection deformable body 120 disposed so as to surround an exterior of the inner support member 110, and also an outer support member 130 disposed so as to further surround the exterior of the inner support member 110. Further, the basic structure body 100 includes: an inner connecting member 140 connecting between the inner support member 110 and the detection deformable body 120, and an outer connecting member 150 connecting between the detection deformable body 120 and the outer support member 130. In the illustrated embodiment, the inner support member 110 is an approximately rectangular parallelepiped-shaped member in which a hollow portion H (through hole) is centrally formed. The detection deformable body 120 is a ring-shaped structure body disposed at the periphery of the inner support member 110, and the outer support member 130 is a ring-shaped structure body disposed so as to further surround the periphery of the inner support member 110.

Further, in the illustrated embodiment, although an example is shown using a ring-shaped detection deformable body 120 and a ring-shaped outer support member 130, in the present description the meaning of the term "ring-shaped" is not limited to "circular ring-shaped", but rather further includes "polygonal ring-shaped" and "shaped like a ring of freely-selected shape". The utilized detection deformable body 120 and the outer support member 130, for example, may be "polygonal ring-shaped", "hexagonal ring-shaped", or "octagonal ring-shaped".

Attachment holes 111 (small circular holes) are arranged at four locations in the inner support member 110, and positioning holes 112 (somewhat large circular holes) are arranged at two locations. In the same manner, attachment holes 131 (small circular holes) are arranged at 6 locations in the outer support member 130, and positioning holes 132 (somewhat large circular holes) are arranged at two locations. In the illustrated embodiment, as shown in FIG. 1, the attachment holes 111 and 131 are through holes penetrating vertically (Z axis direction) similarly to the hollow portion H. Further, although not apparent in FIG. 1, the positioning holes 112 and 132 penetrate vertically (Z axis direction).

This torque sensor is highly suitable for use in an application that attaches the torque sensor to a joint part of a robot arm. For example, if a first arm part is disposed below (−Z side) the basic structure body 100 illustrated in FIG. 1, and if a second arm part is disposed above (+Z side) the basic structure body 100, then the basic structure body 100 functions as a joint member interconnected both arm parts. The attachment holes 111 and 131 are used as holes for insertion of bolts for attachment of the basic structure body 100 to each of the arm parts. In the aforementioned example, a torque applied to the second arm part relative to the first arm part can be detected, for example, if the inner support member 110 is attached to the downward-arranged first arm part by bolts passing through the attachment holes 111, and if the outer support member 130 is attached to the upward-arranged second arm part by bolts passing through the attachment holes 131. Of course, as may be required, threads may be formed in the inner surfaces of the attachment holes 111 and 131.

However, the positioning holes 112 and 132 are holes used for positioning during mounting of the torque sensor, and a positioning operation can be performed by inserting positioning pins through the positioning holes 112 and 132. Of course, the positioning holes 112 and 132 are not necessarily through holes, and the positioning holes may be blind holes.

Further, the attachment holes 111 and 131 and the positioning holes 112 and 132 are not required constituent elements of the torque sensor, and these elements do not perform functions that directly detect torque according to principles of operation of the torque sensor. For example, the attachment holes 111 and 131 are unnecessary if the connections to the arm parts are made by an attachment method that does not use bolts. Further, the positioning holes 112 and 132 are unnecessary if the positioning operation is performed by a different method. Thus the attachment holes 111 and 131 and the positioning holes 112 and 132 are not illustrated in FIG. 2 and drawings thereafter.

Figure 2:
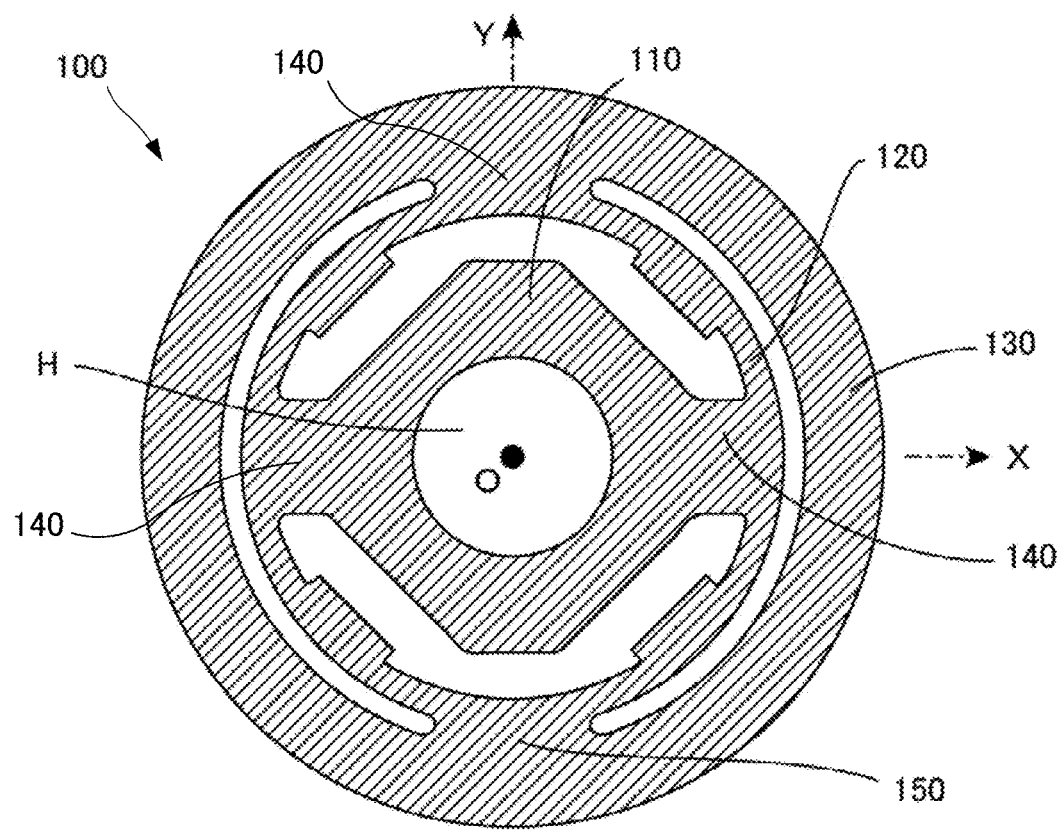
FIG. 2 is a lateral cross-sectional view taken along an XY plane cutting a basic structure body 100 of the torque sensor illustrated in FIG. 1 (attachment holes and positioning holes are not illustrated)

FIG. 2 is a lateral cross-sectional view taken along an XY plane cutting the basic structure body 100 of the torque sensor illustrated in FIG. 1. In the illustrated embodiment, the basic structure body 100 is a disc-shaped single-sheet one-piece structure body, and is formed by wire cut processing of a metal plate of iron, stainless steel, aluminum, and the like. Further, the basic structure body 100 may be formed by cut processing, such as milling, of a metal plate. In the present embodiment, each of the components of the basic structure body 100 is named in consideration of the function of the component, as the inner support member 110, the detection deformable body 120, the outer support member 130, the inner connecting member 140, and the outer connecting member 150.

Although in the aforementioned manner, the attachment holes 111 and the positioning holes 112 are actually arranged in the inner support member 110, and the attachment holes 131 and the positioning holes 132 are actually arranged in the outer support member 130, these holes are not illustrated in FIG. 2.

Figure 3:
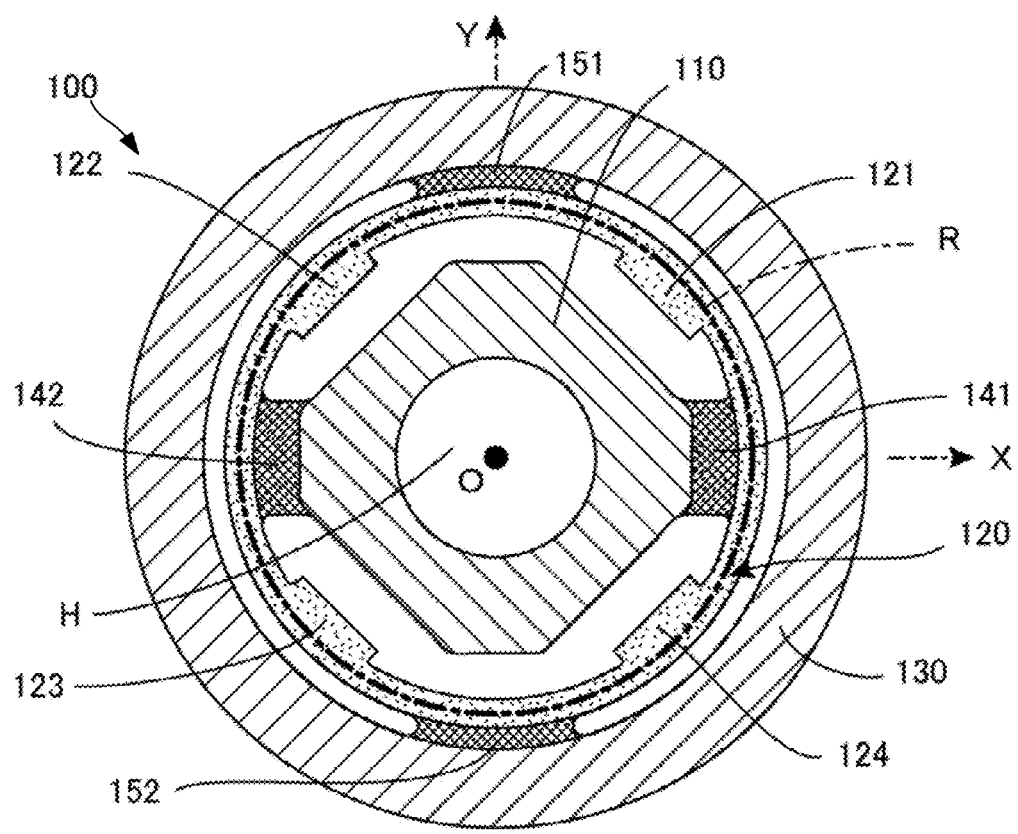
FIG. 3 is a lateral cross-sectional view in which different hatching is indicated for each part of the basic structure body 100 illustrated in FIG. 2.

FIG. 3 is a lateral cross-sectional view in which different hatching is indicated for each part of the basic structure body 100 illustrated in FIG. 2, although this drawing is geometrically entirely the same as FIG. 2. The structure of each component of the basic structure body 100 is described hereinafter with reference to FIG. 3.

Firstly, the centrally-arranged inner support member 110 is an approximately rectangular parallelepiped-shaped member in which the circular hollow portion H is centrally formed, and performs the role of supporting the detection deformable body 120 from the inward side. Although the hollow portion H is not a required component, the hollow portion H is preferably provided in practice. This is due to, if the hollow portion H is formed centrally, an ability to pass various types of components therethrough, as may be required, such as wiring for readout of electrical signals, for example.

The detection deformable body 120 is formed by a ring-shaped structure body disposed along a basic ring-shaped pathway R illustrated by the dot-dashed line in the drawing. In this embodiment, the basic ring-shaped pathway R is a circle drawn in the XY plane and centered on the rotation axis (Z axis), and thus the detection deformable body 120 is formed from a ring-shaped structure body disposed so as to surround the outside of the inner support member 110. When a torque acts around the rotation axis (Z axis) in this sensor in the below described manner, elastic deformation occurs in at least a portion of the detection deformable body 120. Then the acting torque is read out as an electrical signal by detection of such elastic deformation by the detection elements.

The outer support member 130 includes a ring-shaped structure body disposed to the outside of the detection deformable body 120, and in this embodiment, includes a circular ring-shaped structure body extending along a circle having a radius larger than the basic ring-shaped pathway R.

The inner connecting member 140 is a member that performs a role of interconnecting the inner surface of the detection deformable body 120 and the outer surface of the inner support member 110. In the illustrated example, the inner connecting member 140 includes: a first inner connecting member 141 disposed on the positive side of the X axis, and a second inner connecting member 142 disposed on the negative side of the X axis. However, the outer connecting member 150 is a component for performing a role of interconnecting the outer surface of the detection deformable body 120 and the inner surface of the outer support member 130. In the illustrated example, the outer connecting member 150 includes: a first outer connecting member 151 disposed on the positive side of the Y axis, and a second outer connecting member 152 disposed on the negative side of the Y axis.

As a result, the detection deformable body 120 is in a state supported from the inner side thereof by the inner support member 110 through the two inner connecting members 141 and 142, and supported from the outer side thereof by the outer support member 130 via the two outer connecting members 151 and 152.

Although, as illustrated in FIG. 2, the basic structure body 100 is actually a one-piece structure body formed from the same material, upon examination of thickness in the radial direction relative to the Z axis as a central axis, thickness of the detection deformable body 120 is set smaller than thickness of the inner support member 110 and/or the outer support member 130. Thus elastic deformation occurs in at least a portion of the detection deformable body 120.

Here, for convenient description, multiple intervals are arranged along the basic ring-shaped pathway R with respect to the ring-shaped detection deformable body 120 (portion indicated by dot-type hatching) illustrated in FIG. 3. That is to say, the arranged intervals are: intervals fixed to the inner support member 110 by the connecting members 141 and 142, intervals fixed to the outer support member 130 by the connecting members 151 and 152, and intervals positioned between each of such intervals. Further, the intervals fixed to the inner support member 110 or the outer support member 130 by the connecting members 141, 142, 151, and 152 are termed "fixing parts", and the intervals sandwiched between such "fixing parts" are termed "detection parts".

Specifically, the detection deformable body 120 illustrated in FIG. 3 includes the following: a first fixing part (portion positioned in the vicinity of the positive side of the X axis) fixed to the inner support member 110 by the first inner connecting member 141, a second fixing part (portion positioned in the vicinity of the positive side of the Y axis) fixed to the outer support member 130 by the first outer connecting member 151, a third fixing part (portion positioned in the vicinity of the negative side of the X axis) fixed to the inner support member 110 by the second inner connecting member 142, a fourth fixing part (portion positioned in the vicinity of the negative side of the Y axis) fixed to the outer support member 130 by the second outer connecting member 152, a first detection part 121 (portion positioned the first quadrant of the XY coordinate system) sandwiched between the first fixing part and the second fixing part, a second detection part 122 (portion positioned the second quadrant of the XY coordinate system) sandwiched between the second fixing part and the third fixing part, a third detection part 123 (portion positioned the third quadrant of the XY coordinate system) sandwiched between the third fixing part and the fourth fixing part, and a fourth detection part 124 (portion positioned the fourth quadrant of the XY coordinate system) sandwiched between the fourth fixing part and the first fixing part.

Thus the detection deformable body 120 illustrated in FIG. 3 is a structure body that includes four fixing parts and four detection parts disposed alternatingly along the basic ring-shaped pathway R. Here, the four detection parts 121, 122, 123, and 124 are thin in the radial direction as described above, are parts that do not connect to the inner connecting members 141 and 142 and the outer connecting members 151 and 152, and are parts that undergo large elastic deformation due to the action of torque. Further, in the embodiment illustrated here, protuberances are formed protruding convexly somewhat inwardly at the inward portion of each of the detection parts 121, 122, 123, and 124. Each of these protuberances is formed for convenient formation of a displacement electrode, as described below, and is not necessarily required in accordance with the detection principles of the present disclosure.

Of course, if the basic structure body 100 is a one-piece structure body formed from the same material, and if the basic structure body 100 is formed, for example, from a metal such as iron, stainless steel, aluminum, and the like, then elastic deformation would occur in all portions due to the action of torque. However, each of the detection parts 121, 122, 123, and 124 is a part in which elastic deformation readily occurs, and thus the elastic deformation that occurs in the inner support member 110, the outer support member 130, the inner connecting members 141 and 142, and the outer connecting members 151 and 152 is slight in comparison the elastic deformation occurring in each of the detection parts 121, 122, 123, and 124. In other words, in order for the elastic deformation due to the action of torque to be concentrated in each of the detection parts 121, 122, 123, and 124, the other parts are preferably designed to be thick so as to act as much as possible as rigid bodies.

The structures of each portion of the basic structure body 100 are described above with reference to FIG. 2 and FIG. 3. The torque sensor of the present disclosure further includes detection elements appended to the basic structure body 100. In FIG. 1, a torque sensor according to Embodiment 1 is illustrated that includes four detection elements D1 to D4 appended to the basic structure body 100. These four detection elements D1 to D4 have a function for electrical detection of elastic deformation occurring in the detection deformable body 120, and in the illustrated example, each of the detection elements D1 to D4 includes a capacitor element. That is to say, each of the detection elements D1 to D4 includes a capacitor element in which a displacement electrode formed on the inner surface of the detection deformable body 120 opposes a fixed electrode fixed to the outer surface of the inner support member 110. The function of each of these detection elements D1 to D4 is described in detail in the following Section 2.

Section 2, Detection Operation of Embodiment 1

Figure 4:
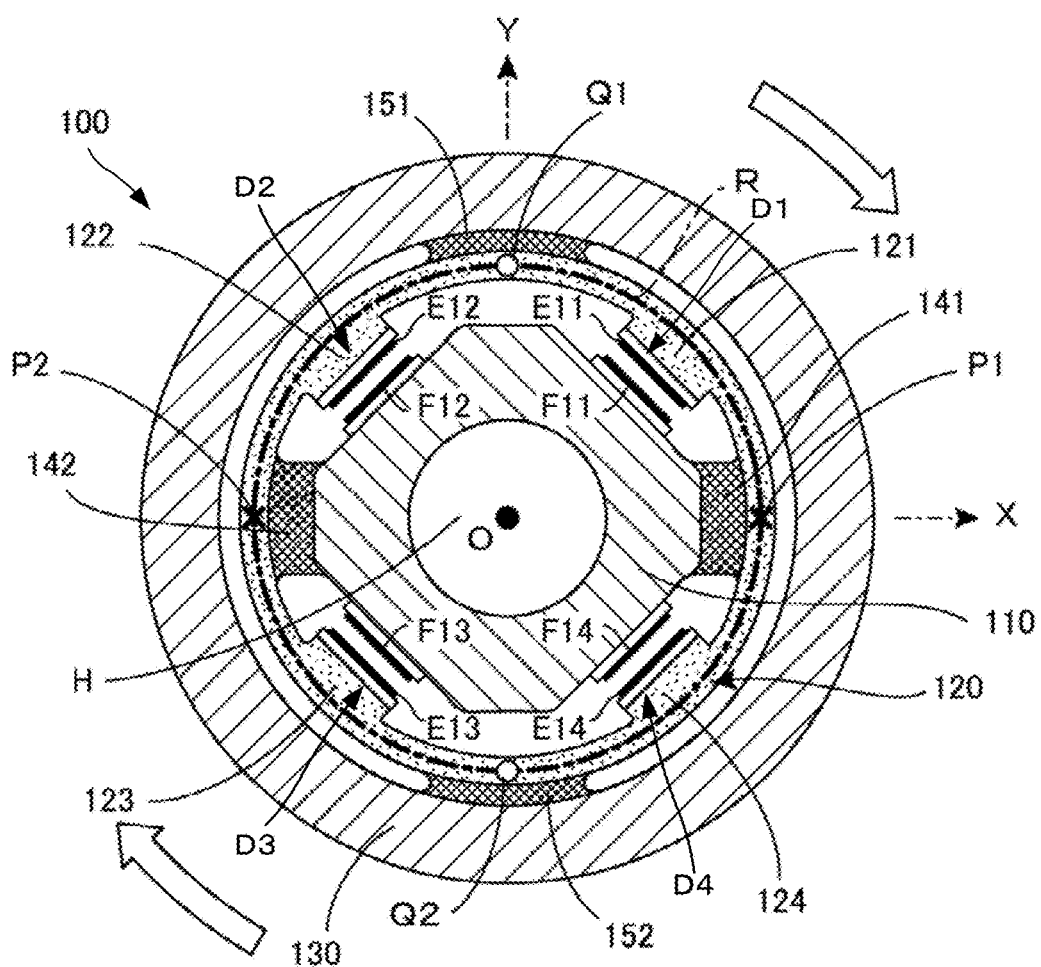
FIG. 4 is a lateral cross-sectional view for description of detection by a torque sensor in which four detection elements are appended to the basic structure body 100 illustrated in FIG. 3.

The detection operation of the torque sensor according to Embodiment 1 illustrated in FIG. 1 is described below with reference to FIG. 4. FIG. 4 is a drawing for description of the detection operation of the torque sensor that includes the four detection elements appended to the basic structure body 100 illustrated in FIG. 3, and corresponds to a lateral cross-sectional view taken along the XY plane of the torque sensor illustrated in FIG. 1. As previously described, although the basic structure body 100 is a one-piece structure body formed from the same material, the various parts in FIG. 4 are illustrated using different types of hatching in the same manner as in FIG. 3.

As illustrated in the drawing, displacement electrodes E11, E12, E13, and E14 are arranged at four respective locations on the inner surface of the detection deformable body 120, and fixed electrodes F11, F12, F13, and F14 are arranged at four respective locations on the outer surface of the inner support member 110.

More specifically, a first displacement electrode E11 is arranged on a protuberance at the inner surface of the first detection part 121, and on the opposing surface of the inner support member 110, the first fixed electrode F11 is arranged opposing the first displacement electrode E11. This pair of electrodes E11 and F11 forms a capacitor element. The first detection element D1 illustrated in FIG. 1 is none other than this capacitor element.

Further, a second displacement electrode E12 is arranged on a protuberance at the inner surface of the second detection part 122, and on the opposing surface of the inner support member 110, the second fixed electrode F12 is arranged opposing the second displacement electrode E12, forming a capacitor element as the second detection element D1 illustrated in FIG. 1. In the same manner, a third displacement electrode E13 is arranged on a protuberance at the inner surface of the third detection part 123, and on the opposing surface of the inner support member 110, the third fixed electrode F13 is arranged opposing the third displacement electrode E13, forming a capacitor element as the third detection element D3 illustrated in FIG. 1. Further, a fourth displacement electrode E14 is arranged on a protuberance at the inner surface of the fourth detection part 124, and on the opposing surface of the inner support member 110, the fourth fixed electrode F14 is arranged opposing the fourth displacement electrode E14, forming a capacitor element as the fourth detection element D4 illustrated in FIG. 1.

Further, an insulation substrate (white coating part in the drawing) is inserted between the inner surface of the detection deformable body 120 and each of the displacement electrodes E11 to E14, and an insulation substrate (white coating part in the drawing) is inserted between the inner support member 110 and each of the fixed electrodes F11 to F14. Due to configuration of the basic structure body 100 from the one-piece structure body formed from metal as illustrated in FIG. 2, the formation of each electrode via the insulation substrate is required in the case of this embodiment to electrically isolate the individual electrodes from one another. Thus arrangement of the insulating substrate is not required when the basic structure body 100 is formed from an insulating material such as a resin.

For convenient description of the detection operation of the torque sensor illustrated in FIG. 4, inner support points P1 and P2 (indicated by "X" symbols in the drawing) and outer support points Q1 and Q2 (indicated by "○" symbols in the drawing) on the ring-shaped basic ring-shaped pathway R (circle in the XY plane encircling the rotation axis (Z axis)) indicated by the dot-dashed line are defined. As illustrated, the two inner support points P1 and P2 and the two outer support points Q1 and Q2 are alternatingly disposed on the basic ring-shaped pathway R. More specifically, the first inner support point P1 is located at an intersection point of the positive-side X axis and the basic ring-shaped pathway R, the second inner support point P2 is located at an intersection point of the negative-side X axis and the basic ring-shaped pathway R, the first outer support point Q1 is located at an intersection point of the positive-side Y axis and the basic ring-shaped pathway R, and the second outer support point Q2 is located at an intersection point of the negative-side Y axis and the basic ring-shaped pathway R.

Now in the state in which the inner support member 110 is fixed, the type of deformation that occurs in the detection deformable body 120 is considered in the case of a moment (torque) acting clockwise on the outer support member 130 around the Z axis, as the rotation axis, as indicated by the white arrows in the drawing. In this case, the inner support points P1 and P2 indicated by the "X" symbols in the drawing are fixed points due to connection to the inner support member 110 through the inner connecting members 141 and 142. However, due to connection of the outer support point Q1 and Q2 indicated by the "○" symbols in the drawing being connected to the outer support member 130 through the outer connecting members 151 and 152, in the case of application of a torque clockwise with respect to the outer support member 130, the outer support points undergo a clockwise rotational force.

Thus the point Q1 moves so as to approach the point P1, and thus the first detection part 121 deforms so as to expand outwardly. The point Q2 similarly moves so as to approach the point P2, and thus the third detection part 123 deforms so as to expand outwardly. As a result, the first displacement electrode E11 is more distant from the first fixed electrode F11, and a capacitance value C1 of the capacitor element (first detection element D1) formed by both electrodes decreases. In the same manner, the third displacement electrode E13 is more distant from the third fixed electrode F13, and a capacitance value C3 of the capacitor element (third detection element D3) formed by both electrodes decreases.

However, the point Q1 moves away from the point P2, and thus the second detection part 122 deforms so as to become inwardly convex. The point Q2 similarly moves away from the point P1, and thus the fourth detection part 124 deforms so as to become inwardly convex. As a result, the second displacement electrode E12 approaches the second fixed electrode F12, and a capacitance value C2 of the capacitor element (second detection element D2) formed by both electrodes increases. In the same manner, the fourth displacement electrode E14 approaches the fourth fixed electrode F14, and a capacitance value C4 of the capacitor element (fourth detection element D4) formed by both electrodes decreases.

Thus the first detection element D1 (capacitor element including the electrode pair E11 and F11) performs the role of detecting elastic deformation of the first detection part 121 disposed in the first quadrant of the XY coordinate system. Further, the second detection element D2 (capacitor element including the electrode pair E12 and F12) performs the role of detecting elastic deformation of the second detection part 122 disposed in the second quadrant of the XY coordinate system. Further, the third detection element D3 (capacitor element including the electrode pair E13 and F13) performs the role of detecting elastic deformation of the third detection part 123 disposed in the third quadrant of the XY coordinate system. Thus the fourth detection element D4 (capacitor element including the electrode pair E14 and F14) performs the role of detecting elastic deformation of the fourth detection part 124 disposed in the fourth quadrant of the XY coordinate system.

In practice, the elastic deformation of each detection part is detected as the displacement in the direction of a radius centered on the Z axis. That is to say, the first detection element D1 performs detection of elastic deformation on the basis of the displacement of the first detection part 121 in the direction of the radius centered on the Z axis. The second detection element D2 performs detection of elastic deformation on the basis of the displacement of the second detection part 122 in the direction of the radius centered on the Z axis. Further, the third detection element D3 performs detection of elastic deformation on the basis of the displacement of the third detection part 123 in the direction of the radius centered on the Z axis. Further, the fourth detection element D4 performs detection of elastic deformation on the basis of the displacement of the fourth detection part 124 in the direction of the radius centered on the Z axis.

In the case of the illustrated embodiment, a capacitor formed from a pair of opposing electrodes is used as each of the detection elements D1 to D4. That is to say, the first detection element D1 includes the first capacitor element; and the first capacitor element includes the first displacement electrode E11 disposed on the inner surface of the first detection part 121, and the first fixed electrode F11 disposed at a position of the inner support member 110 opposing the first displacement electrode E11. The second detection element D2 includes the second capacitor element; and the second capacitor element includes the second displacement electrode E12 disposed on the inner surface of the second detection part 122, and the second fixed electrode F12 disposed at a position of the inner support member 110 opposing the second displacement electrode E12. The third detection element D3 includes the third capacitor element; and the third capacitor element includes the third displacement electrode E13 disposed on the inner surface of the third detection part 123, and the third fixed electrode F13 disposed at a position of the inner support member 110 opposing the third displacement electrode E13. The fourth detection element D4 includes the fourth capacitor element; and the fourth capacitor element includes the fourth displacement electrode E14 disposed on the inner surface of the fourth detection part 124, and the fourth fixed electrode F14 disposed at a position of the inner support member 110 opposing the fourth displacement electrode E14.

For the torque sensor configured in this manner, a detection circuit may be prepared that uses the below listed formula to calculate and output a detection result D for readout, as an electrical signal, of a detection value of the torque acting around the rotation axis (Z axis).

$$D=(C1+C3)-(C2+C4)$$

That is to say, the output of this detection circuit is a difference between (i) a sum (C1+C3) of the capacitance value C1 of the first capacitor element D1 and the capacitance value C3 of the third capacitor element D3, and (ii) a sum (C2+C4) of the capacitance value C2 of the second capacitor element D2 and the capacitance value C4 of the fourth capacitor element D4.

For example, when a torque acts clockwise against the outer support member 130 as illustrated in FIG. 4, in the aforementioned manner, the capacitance values C1 and C3 decrease, and the capacitance values C2 and C4 increase, and thus the difference value "(C1+C3)−(C2+C4)" is output as a negative value. Conversely, when a torque acts counterclockwise against the outer support member 130, the capacitance values C1 and C3 increase, and the capacitance values C2 and C4 decrease, and thus the difference value "(C1+C3)−(C2+C4)" is output as a positive value. Thus the sign of this difference value indicates the direction of the acting torque, and the absolute value of this difference value indicates the size of the acting torque.

Differential detection in this manner is effective for decreasing detection errors. For example, even when the inter-electrode gap changes for each capacitor element due to the occurrence of expansion or contraction in each portion of the basic structure body 100 due to a change in the temperature environment, performance of the aforementioned differential detection enables compensation for errors occurring on the basis of such changes of the inter-electrode gap.

Section 3, Basic Structure of Embodiment 2

Figure 5:
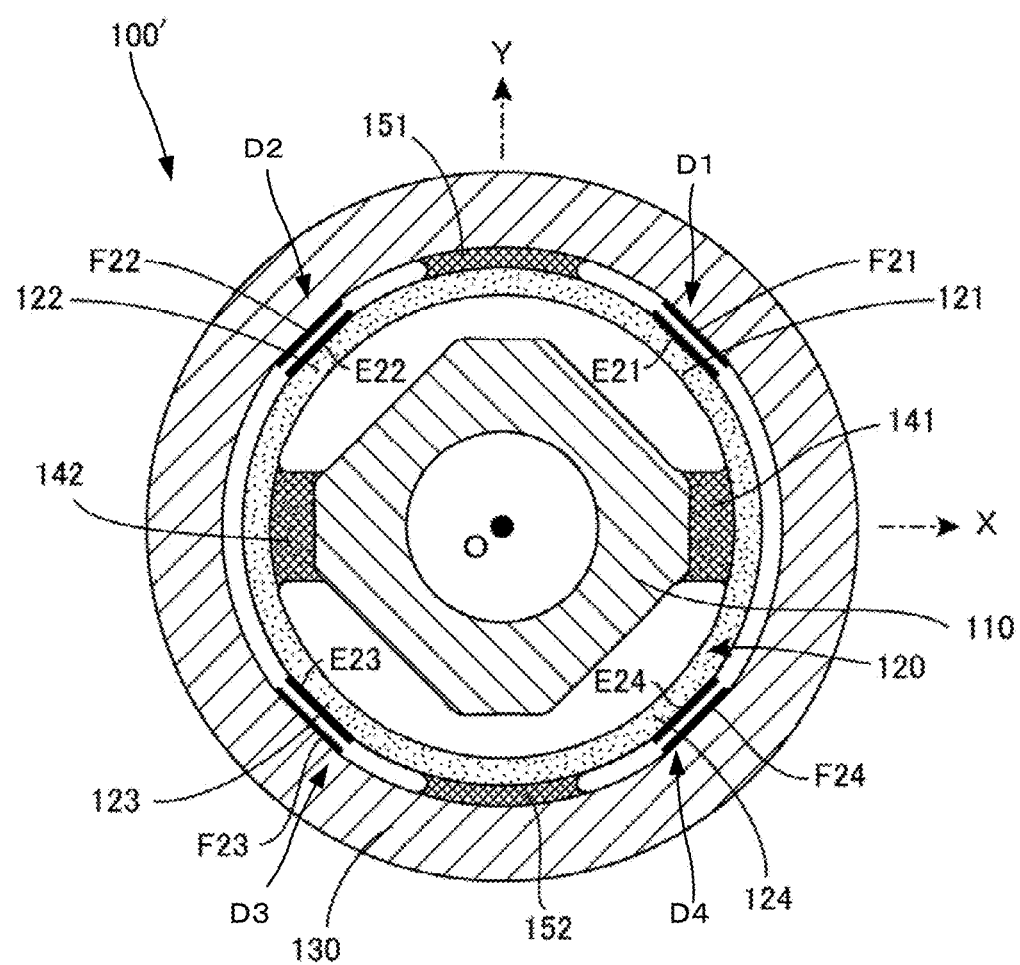
FIG. 5 is a lateral cross-sectional view, in which different hatching is indicated for each part of a torque sensor according to Embodiment 2 of the present disclosure, taken along an XY plane cutting the torque sensor (attachment holes and positioning holes are not illustrated).

A basic structure of a torque sensor according to Embodiment 2 of the present disclosure is described below with reference to FIG. 5. FIG. 5 is a lateral cross-sectional view taken along the XY plane of a torque sensor configured by appending four detection elements to a basic structure body 100'. The basic structure body 100' illustrated in FIG. 5 has nearly the same structure as that of the basic structure body 100 illustrated in FIG. 4, and in the same manner, is formed from a one-piece structure body formed from the same material. In FIG. 5, each of the components has a different type of hatching in the same manner as in FIG. 4.

The only difference between the basic structure body 100' illustrated in FIG. 5 and the basic structure body 100 illustrated in FIG. 4 is the shape of the detection deformable body 120. In other words, the inner support member 110, the outer support member 130, the inner connecting members 141 and 142, and the outer connecting members 151 and 152 illustrated in FIG. 5 are entirely the same as the respective element having the same reference sign as illustrated in FIG. 4. Although the detection deformable body 120 illustrated in FIG. 5 is a constituent element having a somewhat different shape in comparison to the detection deformable body 120 illustrated in FIG. 4, for convenient description, this constituent element is illustrated using the same reference sign "120". In the same manner, although each of the detection parts 121 to 124 illustrated in FIG. 5 is a constituent element having a somewhat different shape in comparison the respective detection parts 121 to 124 illustrated in FIG. 4, the constituent elements are illustrating using the same reference signs "121" to "124".

The torque sensor according to the Embodiment 2 illustrated in FIG. 5 also is configured by appending the four detection elements D1 to D4 to the aforementioned basic structure body 100'. A large difference between Embodiment 1 illustrated in FIG. 4 and Embodiment 2 illustrated in FIG. 5 is, although each of the detection elements D1 to D4 is arranged to the inside of the detection deformable body 120 in the former, each of the detection elements D1 to D4 is arranged to the exterior of the detection deformable body 120 in the later.

Specifically, in the torque sensor according to Embodiment 2 illustrated in FIG. 5, the first detection element D1 includes the first capacitor element; and the first capacitor element includes the first displacement electrode E21 disposed on the outer surface of the first detection part 121, and the first fixed electrode F21 disposed at a position of the outer support member 130 opposing the first displacement electrode E21. Further, the second detection element D2 includes the second capacitor element; and the second capacitor element includes the second displacement electrode E22 disposed on the outer surface of the second detection part 122, and the second fixed electrode F22 disposed at a position of the outer support member 130 opposing the second displacement electrode E22. Further, the third detection element D3 includes the third capacitor element; and the third capacitor element includes the third displacement electrode E23 disposed on the outer surface of the third detection part 123, and the third fixed electrode F23 disposed at a position of the outer support member 130 opposing the third displacement electrode E23. Further, the fourth detection element D4 includes the fourth capacitor element; and the fourth capacitor element includes the fourth displacement electrode E24 disposed on the outer surface of the fourth detection part 124, and the fourth fixed electrode F24 disposed at a position of the outer support member 130 opposing the fourth displacement electrode E24.

When the capacitor elements included in each of the detection elements D1 to D4 in this manner are arranged to the exterior of the detection deformable body 120, the increase-decrease relationship of the capacitance values of each of the capacitor elements reverses relative to Embodiment 1 illustrated in FIG. 4. For example, when a clockwise torque acts upon the outer support member 130 in the state in which the inner support member 110 is fixed in the same manner as in the example described with reference to FIG. 4, the gap between the electrodes E21 and F21 and the gap between the electrodes E23 and F23 illustrated in FIG. 5 decrease, and the capacitance value C1 of the first detection element D1 and the capacitance value C3 of the third detection element D3 increase. However, the gap between the electrodes E22 and F22 and the gap between the electrodes E24 and F24 increase, and the capacitance value C2 of the second detection element D2 and the capacitance value C4 of the fourth detection element D4 decrease.

Thus in a manner similar to Embodiment 1, differential detection is possible, and direction and size of the acting torque can be detected by finding the difference value "(C1+C3)−(C2+C4)". In this case, when a clockwise torque acts on the outer support member 130, the difference value "(C1+C3)−(C2+C4)" has a positive value, and when a counterclockwise torque acts on the support member 130, the difference value "(C1+C3)−(C2+C4)" has a negative value.

Further, in the embodiment illustrated in FIG. 5, the insulation substrate is not interposed between the outer surface of the detection deformable body 120 and each of the displacement electrodes E21 to E24, and the insulation substrate is not interposed between the inner surface of the outer support member 130 and each of the fixed electrodes F21 to F24. This configuration is due to envisioning the basic structure body 100' as being formed by an insulating material such as a resin. In the case of formation of the basic structure body 100' from an electrically conductive material such as a metal, the various electrodes may be formed via the insulation substrate in a manner similar to that of the embodiment illustrated in FIG. 4.

Further, in the embodiment illustrated in FIG. 4, the protuberances are arranged at inward locations of each of detection parts 121, 122, 123, and 124 of the detection deformable body 120, and each of the displacement electrodes E11 to E14 is formed at an apex surface of the respective protuberance, and this configuration is used in order to increase detection sensitivity by decreasing the inter-electrode distance for each of the fixed electrodes F11 to F14. In the embodiment illustrated in FIG. 5, although protuberances are not provided since the distance between the outer surface of the detection deformable body 120 and the inner surface of the outer support member 130 is relatively small, if required, protuberances may be arranged at the outside of the detection deformable body 120.

Section 4, Characteristics and Modified Examples of the Present Disclosure

Although Embodiment 1 of the present disclosure illustrated in FIG. 1 to FIG. 4 and Embodiment 2 illustrated in FIG. 5 are described above, of course the present disclosure is not limited to these embodiments.

For example, Embodiment 1 illustrated in FIG. 4 is an example in which the detection elements D1 to D4 (the displacement electrodes E11 to E14 and the fixed electrodes F11 to F14) are disposed at the inside of the detection deformable body 120, and Embodiment 2 illustrated in FIG. 5 is an example in which the detection elements D1 to D4 (the displacement electrodes E21 to E24 and the fixed electrodes F21 to F24) are disposed at the outside of the detection deformable body 120. However, Embodiment 3 is also possible in which the detection elements are arranged at both the interior and the exterior of the detection deformable body 120. Specifically, in Embodiment 3, the displacement electrodes E21 to E24 and the fixed electrodes F21 to F24 according to Embodiment 2 illustrated in FIG. 5 may be further appended to the structure according to Embodiment 1 illustrated in FIG. 4.

In summary, in Embodiment 3, the first detection element D1 includes first inner capacitor elements and first outer capacitor elements. The first inner capacitor element includes the first inner displacement electrode E11 disposed on the inner surface of the first detection part 121, and a first inner fixed electrode F11 disposed at a position on the inner support member 110 opposing the first inner displacement electrode E11. The first outer capacitor element includes the first outer displacement electrode E21 disposed on the outer surface of the first detection part 121, and a first outer fixed electrode F21 disposed at a position on the outer support member 130 opposing the first outer displacement electrode E21. Further, the second detection element D2 includes the second inner capacitor element and the second outer capacitor element. The second inner capacitor element includes the second inner displacement electrode E12 disposed on the inner surface of the second detection part 122, and a second inner fixed electrode F12 disposed at a position on the inner support member 110 opposing the second inner displacement electrode E12. The second outer capacitor element includes the second outer displacement electrode E22 disposed on the outer surface of the second detection part 122, and a second outer fixed electrode F22 disposed at a position on the outer support member 130 opposing the second outer displacement electrode E22.

In this manner, in Embodiment 3, the third detection element D3 includes the third inner capacitor element and the third outer capacitor element. The third inner capacitor element includes the third inner displacement electrode E13 disposed on the inner surface of the third detection part 123, and a third inner fixed electrode F13 disposed at a position on the inner support member 110 opposing the third inner displacement electrode E13. The third outer capacitor element includes the third outer displacement electrode E23 disposed on the outer surface of the third detection part 123, and a third outer fixed electrode F23 disposed at a position on the outer support member 130 opposing the third outer displacement electrode E23. Further, the fourth detection element D4 includes the fourth inner capacitor element and the fourth outer capacitor element. The fourth inner capacitor element includes the fourth inner displacement electrode E14 disposed on the inner surface of the fourth detection part 124, and a fourth inner fixed electrode F14 disposed at a position on the inner support member 110 opposing the fourth inner displacement electrode E14. The fourth outer capacitor element includes the fourth outer displacement electrode E24 disposed on the outer surface of the fourth detection part 124, and a fourth outer fixed electrode F24 disposed at a position on the outer support member 130 opposing the fourth outer displacement electrode E24.

The torque sensors of each of the embodiments described heretofore are characterized in that, when the Z axis of the XYZ three-dimensional orthogonal coordinate system is disposed so as to be the rotation axis, the basic ring-shaped pathway R is included in the XY plane, and each of the detection deformable body 120, the inner support member 110, the outer support member 130, the inner connecting member 140, and the outer connecting member 150 is disposed along the XY plane. That is to say, each of the detection deformable body 120, the inner support member 110, the outer support member 130, the inner connecting member 140, and the outer connecting member 150 is disposed at a position included in the XY plane (position cut by the XY plane). Thus each of the detection deformable body 120, the inner support member 110, the outer support member 130, the inner connecting member 140, and the outer connecting member 150 appears in the cross section taken along the XY plane illustrated in FIG. 4 or FIG. 5. The arrangement of components along the XY plane in this manner is important for achieving a thin-type torque sensor having reduced thickness.

In particular as made clear upon viewing FIG. 1, in the XYZ three-dimensional orthogonal coordinate system, for the torque sensors of each of the embodiments described heretofore, the upper surface of the outer support member 130 is positioned in a first plane indicated by the formula $Z=+d$, the lower surface of the outer support member 130 is positioned in a second plane indicated by the formula $Z=-d$, and the each of the detection deformable body 120, the inner support member 110, the outer support member 130, the inner connecting member 140, and the outer connecting member 150 is sandwiched between the first plane and the second plane. Further, the capacitor elements included in each of the detection elements D1 to D4 are also contained within the aforementioned space.

Adoption of such a configuration reduces thickness of the entire torque sensor (Z-axis direction distance) makes possible reduction of the overall thickness of the torque sensor to within the range of 2d and enables achievement of a thin-type torque sensor having reduced thickness and a simple structure. Of course, per the principles of operation, arrangement of each of the detection elements D1 to D4 at a position in the aforementioned space is sufficient, and a portion thereof may protrude from the aforementioned space without hindering detection. However, in order to make the overall torque sensor thin by reduction of thickness to within the range of 2d, the capacitor elements included in each of the detection elements D1 to D4 are also preferably contained within the aforementioned space.

When this torque sensor is used by attachment to a joint part or the like of a robot arm, minor modifications are further preferably made to the upper surface position and the lower surface position of each part. For example, a case is considered below in which this torque sensor used by insertion between an upper arm part and a lower arm part of a robot arm, the outer support member 130 is connected to a lower surface of the upwardly disposed upper arm part, and the inner support member 110 is connected to an upper surface of the downwardly disposed lower arm part. If such an application is assumed, then the position of the upper surface of the outer support member 130 in FIG. 1 is preferably modified to become a plane indicated by the formula $Z=+d+\delta1$, and the position of the lower surface of the inner support member 110 is preferably modified to become a plane indicated by the formula $Z=-d-\delta2$. By such modification, a predetermined gap size $\delta1$ is secured between the upper surface of the inner support member 110 and the lower surface of the upper arm part, and unnecessary contact between such components can be prevented; while similarly, a predetermined gap size $\delta2$ is secured between the lower surface of the outer support member 130 and the upper surface of the lower arm part, and unnecessary contact between such components can be prevented.

Of course, the aforementioned gap dimensions $\delta1$ and $\delta2$ may be secured by modifications such as arranging a step structure in the upper surface of the outer support member 130 (for example, by forming a protuberance such that a portion projects upward), and arranging a step structure in the lower surface of the inner support member 110 (for example, by forming a protuberance such that a portion projects downward). In summary, as illustrated in FIG. 1, when the Z axis of the XYZ three-dimensional orthogonal coordinate system is taken to be the vertically extending vertical axis, a structure is such that the upper end surface (most upwardly located surface) of the outer support member 130 is positioned by a predetermined gap distance $\delta1$ above the upper end surface (most upwardly located surface) of the inner support member 110, and the lower end surface (most downwardly located surface) of the inner support member 110 is positioned by a predetermined gap distance $\delta2$ below the lower end surface (most downwardly located surface) of the outer support member 130. Although due to such configuration overall thickness becomes somewhat larger than 2d, unnecessary contact can be avoided also in the case of an application using attachment to the joint part or the like of the robot arm.

Further, in the embodiments described heretofore such as in the example illustrated in FIG. 4, the two inner support points P1 and P2 and the two outer support points Q1 and Q2 are alternatingly disposed on the basic ring-shaped pathway R, and two inner connecting members 141 and 142 and two outer connecting members 151 and 152 are arranged. However, the number of the inner support points P is not necessarily limited to two, and the number of the outer support points Q is not necessarily limited to two. For example, three inner support points P1, P2, and P3 and three outer support points Q1, Q2, and Q3 can be alternatingly disposed on the basic ring-shaped pathway R, and three inner connecting members 141, 142, and 143 and three outer connecting members 151, 152, and 153 can be arranged.

In summary, according to the torque sensor of the present disclosure, at least one inner support point P and at least one outer support point Q are defined on the basic ring-shaped pathway R at different positions alternatingly on the basic ring-shaped pathway R. Further, the inner connecting surface arranged in the vicinity of the inner support point P of the inner surface of the detection deformable body and the opposing surface of the inner support member 110 opposing the inner connecting surface may be connected together by the inner connecting member, and the outer connecting surface arranged in the vicinity of the outer support point of the outer surface of the detection deformable body and the opposing surface of the outer support member 130 opposing the outer connecting surface may be connected together by the outer connecting member. Further, the detection element may be configured to detect elastic deformation by the detection part positioned between the inner support point P and the outer support point Q of the detection deformable body.

In practical use, a plurality of n (n□2) inner support points P and a plurality of n outer support points Q are most preferably disposed alternatingly on the basic ring-shaped pathway R, and a plurality of n inner connecting members and a plurality of n outer connecting members are most preferably arranged. Also in this case, the plurality of n inner connecting members may interconnect the inner connecting surface arranged in the vicinity of the inner support point P of the inner surface of the respective connecting detection deformable body and the opposing surface of the detection deformable body opposing the inner connecting surface of the inner support member, and the plurality of n outer connecting members may interconnect the outer connecting surface arranged in the vicinity of the outer support point Q of the outer surface of the respective detection deformable body and the opposing surface of the respective detection deformable body opposing the outer connecting surface of the outer support member. Embodiment 1 and Embodiment 2 described heretofore are examples in which n is set equal to 2.

Further, the embodiments described heretofore are examples in which the basic ring-shaped pathway R is configured by setting a first circle disposed in the XY plane and centered on the origin point O, the detection deformable body 120 includes a ring-shaped structure body extending along this first circle, the outer support member 130 is disposed in the XY plane centered on the origin point O, and the ring-shaped structure body extends along a second circle having a radius larger than a radius of the first circle. However, as described above, the detection deformable body 120 or the outer support member 130 is not necessarily required to be configured as a ring-shaped structure body. For example, a configuration can use a polyhedral structure body assuming a planar rectangle-shape, or a configuration can use a ring-shaped structure body assuming a planar hexagonal shape. Of course, the inner support member 110 may have any configuration as long as the inner support member 110 is disposed in the XY plane and centered on the origin point O, and is configured as the ring-shaped structure body extending along the third circle having the radius smaller than the first circle.

Finally, modified examples of the detection element are described below. In the embodiments described heretofore, the utilized detector elements are capacitors configured as mutually opposing displacement electrodes and fixing electrodes, the displacement electrodes being disposed on the inner surface (Embodiment 1) or the outer surface (Embodiment 2) of the detection deformable body, and the fixed electrodes being disposed on the outer surface (Embodiment 1) or the inner surface (Embodiment 2) of the inner support member. However, the detection element in the present disclosure is not necessarily the capacitor element, and the detection element may be any element having a function for detection, in some form or another, of elastic deformation occurring in the detection deformable body.

For example, a strain gauge may be used in place of the capacitor element as the detection element. Specifically, strain gauges functioning as respective detection elements may be pasted on detection parts 121 to 124 arranged at four positions on the detection deformable body 120, and torque may be detected by electrical detection of changes in resistance values of each of the strain gauges.

However, the capacitor element in practice is most appropriate as the detection element according to the present disclosure. The capacitor element is quite inexpensive due to the ability to be formed by simple electrode layers. Further, the manufacturing process can be simplified by use of the capacitor element. For example, in the case of Embodiment 1 illustrated in FIG. 1, after production of the basic structure body 100 as a metallic one-piece structure body, pasting on at predetermined positions eight insulation substrates having electrodes formed thereon is sufficient processing.

Further, in the case of formation of the detection element by the capacitor element, among the pair of opposing electrodes, the surface area of one of the electrodes is preferably set larger than the surface area of the other electrode. This configuration is used in order to maintain effective surface area of the capacitor element constant even when the displacement electrode moves somewhat in the rotation direction due to the action of torque and relative positional displacement occurs between both electrodes. The capacitance value of the capacitor element, rather than depending only on the inter-electrode distance of the opposing pair of electrodes, also depends on the effective opposing surface areas. Thus if one surface area is set larger than the other surface area so that the electrodes are configured to maintain a fixed effective opposing surface area even when the position of the displacement electrode changes somewhat, the capacitance value then depends only on the inter-electrode distance, and thus detection can be more accurate.

Further, in the embodiments described heretofore, although mutually independent individual electrodes are used as the electrodes used in the individual capacitor elements, either the displacement electrodes or the fixed electrodes can be configured as a single common electrode. For example, in the example illustrated in FIG. 5, rather than forming four separate displacement electrodes E21 to E24, a single common electrode can be formed that covers the outer surface of the detection deformable body 120, and partial regions (regions opposing the fixed electrodes F21 to F24) of the common electrode can be used as the respective displacement electrodes E21 to E24.

Even if one type of the electrodes is formed by a common electrode, if the other type of the electrodes is formed by individual electrodes, electrically separate respective capacitor elements are formed. Alternatively, in the aforementioned case, if the detection deformable body 120 is formed from an electrically conductive material such as a metal, then the surface layer of the outer surface of the detection deformable body 120 can be used as is for the common electrode. Of course, rather than a configuration using a single common electrode as the displacement electrodes, a configuration may be used in which the fixed electrodes are a single common electrode.

However, due to a tendency for noise to occur in the detection signal when the capacitance value is detected electrically using a configuration in which one of the types of electrodes is the common electrode, the individual electrodes are preferably configured as separate electrodes when accurate detection with high sensitivity is required.

Further, although each of the electrodes forming the capacitor elements is configured as a plate-shaped electrode layer in the embodiments described heretofore, the electrodes are not necessarily plate-shaped, and the electrodes may be somewhat curved. For example, although FIG. 5 illustrates an example in which each of the displacement electrodes E21 to E24 and each of the fixed electrodes F21 to F24 is plate-shaped, a curved surface along the outer surface of the detection deformable body 120 may be used as each of the displacement electrodes E21 to E24, and a curved surface along the inner surface of the outer support member may be used as each of the displacement electrodes F21 to F24.

Further, in the embodiments described heretofore, although a torque sensor is provided with four capacitor elements, each formed by a respective pair of the displacement electrodes E21 to E24 and the fixed electrodes F21 to F24, the present disclosure is not limited to this configuration. If the acting of the torque around the rotation axis (Z axis) is to be detected by the torque sensor (that is, without detecting the torque direction and the torque magnitude), the torque sensor may be equipped with a single capacitor element as the displacement electrode E21 and the fixed electrode F21 pair, for example.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese patent Application No. 2015-149611, filed on Jul. 29, 2015, the entire disclosure of which is incorporated by reference herein.

REFERENCE SIGNS LIST

100 Basic structure body of torque sensor (Embodiment 1)
100' Basic structure body of torque sensor (Embodiment 2)
110 Inner support member
111 Attachment hole
112 Positioning hole
120 Detection deformable body
121 First detection part
122 Second detection part
123 Third detection part
124 Fourth detection part
130 Outer support member
131 Attachment hole
132 Positioning hole
140 Inner connecting member
141 First inner connecting member
142 Second inner connecting member
150 Outer connecting member
151 First outer connecting member
152 Second outer connecting member
D1 First detection element
D2 Second detection element
D3 Third detection element
D4 Fourth detection element
d Thickness direction dimensional value
E11 First displacement electrode
E12 Second displacement electrode
E13 Third displacement electrode
E14 Fourth displacement electrode
E21 First displacement electrode
E22 Second displacement electrode
E23 Third displacement electrode
E24 Fourth displacement electrode
F11 First fixed electrode
F12 Second fixed electrode
F13 Third fixed electrode
F14 Fourth fixed electrode
F21 First fixed electrode
F22 Second fixed electrode
F23 Third fixed electrode
F24 Fourth fixed electrode
H Hollow portion
O Origin point of three-dimensional orthogonal coordinate system
P1 First inner support point
P2 Second inner support point
Q1 First outer support point
Q2 Second outer support point
R Basic ring-shaped pathway
X XYZ three-dimensional orthogonal coordinate system coordinate axis
Y XYZ three-dimensional orthogonal coordinate system coordinate axis
Z XYZ three-dimensional orthogonal coordinate system coordinate axis

What is claimed is:

1. A torque sensor for detection of a torque around a rotation axis, the torque sensor comprising:
a detection deformable body having elastic deformability in at least a portion thereof, and including a ring-shaped structure body disposed along a basic ring-shaped pathway surrounding a periphery of the rotation axis;
an inner support member disposed at an inner side of the detection deformable body;
an outer support member including a ring-shaped structure body disposed at an outer side of the detection deformable body;
an inner connecting member connecting the detection deformable body and the inner support member;
an outer connecting member connecting the detection deformable body and the outer support member; and a detection element for detecting elastic deformation occurring in the detection deformable body, wherein, when an inner support point and an outer support point are defined at mutually different positions of the basic ring-shaped pathway, (i) the inner connecting member connects together an inner connecting surface disposed in a vicinity of the inner support point of an inner surface of the detection deformable body and an opposing surface of the inner support member facing the inner connecting surface, (ii) the outer connecting member connects together an outer connecting surface disposed in a vicinity of the outer support point of the outer surface of the detection deformable body and an opposing surface of the outer support member facing the outer connecting surface, and (iii) the detection element detects elastic deformation of a detection part positioned between the inner support point and the outer support point of the detection deformable body, wherein, when the rotation axis is disposed on a Z axis of an XYZ three-dimensional orthogonal coordinate system, the basic ring-shaped passageway is included in an XY plane, and the detection deformable body, the inner support member, the outer support member, the inner connecting member, and the outer connecting member are each disposed along the XY plane, wherein, the inner support point is (i) a first inner support point and (ii) a second inner support point and the outer support point is (iii) a first outer support point and (iv) a second outer support point in the basic ring-shaped pathway, the inner support points and the outer support points are alternatingly arranged, the inner connecting member is (i) a first inner connecting member and (ii) a second inner connecting member, and the outer connecting member is (iii) a first outer connecting member and (iv) a second outer connecting member, wherein the first inner support point is disposed at an intersection of a positive side of the X axis and the basic ring-shaped pathway, the second inner support point is disposed at an intersection of a negative side of the X axis and the basic ring-shaped pathway, the first outer support point is disposed at an intersection of a positive side of the Y axis and the basic ring-shaped pathway, and the second outer support point is disposed at an intersection of a negative side of the Y axis and the basic ring-shaped pathway, and the first inner connecting member is disposed on the positive side of the X axis, the second inner connecting member is disposed on the negative side of the X axis, the first outer connecting member is disposed on the positive side of the Y axis, and the second outer connecting member is disposed on the negative side of the Y axis, wherein the detection part is: (i) a first detection part disposed in a first quadrant of the XY coordinate system, (ii) a second detection part disposed in a second quadrant of the XY coordinate system, (iii) a third detection part disposed in a third quadrant of the XY coordinate system, and (iv) a fourth detection part disposed in a fourth quadrant of the XY coordinate system, and the detection element is: (i) a first detection element for detection of elastic deformation of the first detection part, (ii) a second detection element for detection of elastic deformation of the second detection part, (iii) a third detection element for detection of elastic deformation of the third detection part, and (iv) a fourth detection element for detection of elastic deformation of the fourth detection part, wherein, the first detection element detects elastic deformation based on a radial direction displacement of the first detection part centered on the Z axis, the second detection element detects deformation based on a radial direction displacement of the second detection part centered on the Z axis, the third detection element detects deformation based on a radial direction displacement of the third detection part centered on the Z axis, and the fourth detection element detects deformation based on a radial direction displacement of the fourth detection part centered on the Z axis, wherein the first detection element comprises a first capacitor element including (i) a first displacement electrode disposed on an inner surface of the first detection part, and (ii) a first fixed electrode disposed on the inner support member at a position thereof opposing the first displacement electrode, the second detection element comprises a second capacitor element including (i) a second displacement electrode disposed on an inner surface of the second detection part, and (ii) a second fixed electrode disposed on the inner support member at a position thereof opposing the second displacement electrode, the third detection element comprises a third capacitor element including (i) a third displacement electrode disposed on an inner surface of the third detection part, and (ii) a third fixed electrode disposed on the inner support member at a position thereof opposing the third displacement electrode, and the fourth detection element comprises a fourth capacitor element including (i) a fourth displacement electrode disposed on an inner surface of the fourth detection part, and (ii) a fourth fixed electrode disposed on the inner support member at a position thereof opposing the fourth displacement electrode.

2. The torque sensor according to claim 1, further comprising a detection circuit for outputting of a detection value of the torque acting around the rotation axis based on a difference between:

(i) a sum of a capacitance value of the first capacitor element and a capacitance value of the third capacitor element, and (ii) a sum of a capacitance value of the second capacitor element and a capacitance value of the fourth capacitor element.

3. The torque sensor according to claim 1, wherein the basic ring-shaped pathway is a first circle disposed in the XY plane and centered on an origin point O, the ring-shaped structure body included in the detection deformable body extends along the first circle, the outer support member is disposed in the XY plane and is centered on the origin point O, and the ring-shaped structure body included in the outer support member extends along a second circle having a radius larger than a radius of the first circle.

4. The torque sensor according to claim 3, wherein the inner support member comprises:

a ring-shaped structure body disposed in the XY plane, centered on the origin point O, and extending along a third circle having a radius smaller than the radius of the first circle.

5. The torque sensor according to claim 1, wherein
within the XYZ three-dimensional orthogonal coordinate system, an upper surface of the outer support member is disposed in a first plane indicated by a formula Z=+d, and a lower surface of the outer support member is disposed in a second plane indicated by a formula Z=−d, and
all of the detection deformable body, the inner support member, the outer support member, the inner connecting member, and the outer connecting member are contained within a space sandwiched between the first plane and the second plane.

6. The torque sensor according to claim 1, wherein
when the Z axis of the XYZ three-dimensional orthogonal coordinal system is a vertical axis,
an upper end surface of the outer support member is positioned above an upper end surface of the inner support member by a predetermined gap, and
a lower end surface of the inner support member is positioned below a lower end surface of the outer support member by a predetermined gap.

7. A torque sensor for detection of a torque around a rotation axis, the torque sensor comprising:
a detection deformable body having elastic deformability in at least a portion thereof, and including a ring-shaped structure body disposed along a basic ring-shaped pathway surrounding a periphery of the rotation axis;
an inner support member disposed at an inner side of the detection deformable body;
an outer support member including a ring-shaped structure body disposed at an outer side of the detection deformable body;
an inner connecting member connecting the detection deformable body and the inner support member;
an outer connecting member connecting the detection deformable body and the outer support member; and
a detection element for detecting elastic deformation occurring in the detection deformable body,
wherein, when an inner support point and an outer support point are defined at mutually different positions of the basic ring-shaped pathway,
(i) the inner connecting member connects together an inner connecting surface disposed in a vicinity of the inner support point of an inner surface of the detection deformable body and an opposing surface of the inner support member facing the inner connecting surface,
(ii) the outer connecting member connects together an outer connecting surface disposed in a vicinity of the outer support point of the outer surface of the detection deformable body and an opposing surface of the outer support member facing the outer connecting surface, and
(iii) the detection element detects elastic deformation of a detection part positioned between the inner support point and the outer support point of the detection deformable body,
wherein, when the rotation axis is disposed on a Z axis of an XYZ three-dimensional orthogonal coordinate system, the basic ring-shaped passageway is included in an XY plane,
and the detection deformable body, the inner support member, the outer support member, the inner connecting member, and the outer connecting member are each disposed along the XY plane,
wherein, the inner support point is (i) a first inner support point and (ii) a second inner support point and the outer support point is (iii) a first outer support point and (iv) a second outer support point in the basic ring-shaped pathway,
the inner support points and the outer support points are alternatingly arranged,
the inner connecting member is (i) a first inner connecting member and (ii) a second inner connecting member, and the outer connecting member is (iii) a first outer connecting member and (iv) a second outer connecting member,
wherein
the first inner support point is disposed at an intersection of a positive side of the X axis and the basic ring-shaped pathway, the second inner support point is disposed at an intersection of a negative side of the X axis and the basic ring-shaped pathway, the first outer support point is disposed at an intersection of a positive side of the Y axis and the basic ring-shaped pathway, and the second outer support point is disposed at an intersection of a negative side of the Y axis and the basic ring-shaped pathway, and
the first inner connecting member is disposed on the positive side of the X axis, the second inner connecting member is disposed on the negative side of the X axis, the first outer connecting member is disposed on the positive side of the Y axis, and the second outer connecting member is disposed on the negative side of the Y axis,
wherein
the detection part is: (i) a first detection part disposed in a first quadrant of the XY coordinate system, (ii) a second detection part disposed in a second quadrant of the XY coordinate system, (iii) a third detection part disposed in a third quadrant of the XY coordinate system, and (iv) a fourth detection part disposed in a fourth quadrant of the XY coordinate system, and
the detection element is: (i) a first detection element for detection of elastic deformation of the first detection part, (ii) a second detection element for detection of elastic deformation of the second detection part, (iii) a third detection element for detection of elastic deformation of the third detection part, and (iv) a fourth detection element for detection of elastic deformation of the fourth detection part,
wherein, the first detection element detects elastic deformation based on a radial direction displacement of the first detection part centered on the Z axis,
the second detection element detects deformation based on a radial direction displacement of the second detection part centered on the Z axis,
the third detection element detects deformation based on a radial direction displacement of the third detection part centered on the Z axis, and
the fourth detection element detects deformation based on a radial direction displacement of the fourth detection part centered on the Z axis,
wherein,
the first detection element comprises a first capacitor element including (i) a first displacement electrode disposed on an outer surface of the first detection part, and (ii) a first fixed electrode disposed on the outer support member at a position thereof opposing the first displacement electrode, the second detection element comprises a second capacitor element including (i) a second displacement electrode disposed on an outer surface of the second detection part, and (ii) a second fixed electrode disposed on the outer support member at a position thereof opposing the second displacement electrode, the third detection element comprises a third capacitor element including (i) a third displacement electrode disposed on an outer surface of the third detection part, and (ii) a third fixed electrode disposed on the outer support member at a position thereof opposing the third displacement electrode, and the fourth detection element comprises a fourth capacitor element including (i) a fourth displacement electrode disposed on an outer surface of the fourth detection part, and (ii) a fourth fixed electrode disposed on the outer support member at a position thereof opposing the fourth displacement electrode.

8. A torque sensor for detection of a torque around a rotation axis, the torque sensor comprising:
   a detection deformable body having elastic deformability in at least a portion thereof, and including a ring-shaped structure body disposed along a basic ring-shaped pathway surrounding a periphery of the rotation axis;
   an inner support member disposed at an inner side of the detection deformable body;
   an outer support member including a ring-shaped structure body disposed at an outer side of the detection deformable body;
   an inner connecting member connecting the detection deformable body and the inner support member;
   an outer connecting member connecting the detection deformable body and the outer support member; and
   a detection element for detecting elastic deformation occurring in the detection deformable body,
   wherein, when an inner support point and an outer support point are defined at mutually different positions of the basic ring-shaped pathway,
   (i) the inner connecting member connects together an inner connecting surface disposed in a vicinity of the inner support point of an inner surface of the detection deformable body and an opposing surface of the inner support member facing the inner connecting surface,
   (ii) the outer connecting member connects together an outer connecting surface disposed in a vicinity of the outer support point of the outer surface of the detection deformable body and an opposing surface of the outer support member facing the outer connecting surface, and
   (iii) the detection element detects elastic deformation of a detection part positioned between the inner support point and the outer support point of the detection deformable body,
   wherein, when the rotation axis is disposed on a Z axis of an XYZ three-dimensional orthogonal coordinate system, the basic ring-shaped passageway is included in an XY plane,
   and the detection deformable body, the inner support member, the outer support member, the inner connecting member, and the outer connecting member are each disposed along the XY plane,
   wherein, the inner support point is (i) a first inner support point and (ii) a second inner support point and the outer support point is (iii) a first outer support point and (iv) a second outer support point in the basic ring-shaped pathway,
   the inner support points and the outer support points are alternatingly arranged,
   the inner connecting member is (i) a first inner connecting member and (ii) a second inner connecting member, and the outer connecting member is (iii) a first outer connecting member and (iv) a second outer connecting member,
   wherein
   the first inner support point is disposed at an intersection of a positive side of the X axis and the basic ring-shaped pathway, the second inner support point is disposed at an intersection of a negative side of the X axis and the basic ring-shaped pathway, the first outer support point is disposed at an intersection of a positive side of the Y axis and the basic ring-shaped pathway, and the second outer support point is disposed at an intersection of a negative side of the Y axis and the basic ring-shaped pathway, and
   the first inner connecting member is disposed on the positive side of the X axis, the second inner connecting member is disposed on the negative side of the X axis, the first outer connecting member is disposed on the positive side of the Y axis, and the second outer connecting member is disposed on the negative side of the Y axis,
   wherein
   the detection part is: (i) a first detection part disposed in a first quadrant of the XY coordinate system, (ii) a second detection part disposed in a second quadrant of the XY coordinate system, (iii) a third detection part disposed in a third quadrant of the XY coordinate system, and (iv) a fourth detection part disposed in a fourth quadrant of the XY coordinate system, and
   the detection element is: (i) a first detection element for detection of elastic deformation of the first detection part, (ii) a second detection element for detection of elastic deformation of the second detection part, (iii) a third detection element for detection of elastic deformation of the third detection part, and (iv) a fourth detection element for detection of elastic deformation of the fourth detection part,
   wherein, the first detection element detects elastic deformation based on a radial direction displacement of the first detection part centered on the Z axis,
   the second detection element detects deformation based on a radial direction displacement of the second detection part centered on the Z axis,
   the third detection element detects deformation based on a radial direction displacement of the third detection part centered on the Z axis, and
   the fourth detection element detects deformation based on a radial direction displacement of the fourth detection part centered on the Z axis,
   wherein
   the first detection element comprises:
   a first inner capacitor element including (i) a first inner displacement electrode disposed on an inner surface of the first detection part, and (ii) a first fixed electrode disposed on the inner support member at a position thereof opposing the first displacement electrode, and
   a first outer capacitor element including (i) a first outer displacement electrode disposed on an outer surface of the first detection part, and (ii) a first outer fixed electrode disposed on the outer support member at a position thereof opposing the first outer displacement electrode, the second detection element comprises:
- a second inner capacitor element including (i) a second inner displacement electrode disposed on an inner surface of the second detection part, and (ii) a second fixed electrode disposed on the inner support member at a position thereof opposing the second displacement electrode, and
- a second outer capacitor element including (i) a second outer displacement electrode disposed on an outer surface of the second detection part, and (ii) a second outer fixed electrode disposed on the outer support member at a position thereof opposing the second outer displacement electrode, the third detection element comprises:
- a third inner capacitor element including (i) a third inner displacement electrode disposed on an inner surface of the third detection part, and (ii) a third fixed electrode disposed on the inner support member at a position thereof opposing the third displacement electrode, and
- a third outer capacitor element including (i) a third outer displacement electrode disposed on an outer surface of the third detection part, and (ii) a third outer fixed electrode disposed on the outer support member at a position thereof opposing the third outer displacement electrode, and the fourth detection element comprises:
- a fourth inner capacitor element including (i) a fourth inner displacement electrode disposed on an inner surface of the fourth detection part, and (ii) a fourth fixed electrode disposed on the inner support member at a position thereof opposing the fourth displacement electrode, and
- a fourth outer capacitor element including (i) a fourth outer displacement electrode disposed on an outer surface of the fourth detection part, and (ii) a fourth outer fixed electrode disposed on the outer support member at a position thereof opposing the fourth outer displacement electrode.

* * * * *